United States Patent [19]

Palombo et al.

[11] Patent Number: 4,477,757
[45] Date of Patent: Oct. 16, 1984

[54] PHASE COMMUTATOR FOR CLOSED LOOP CONTROL OF A STEPPING MOTOR

[75] Inventors: Gaston A. Palombo, Agoura; Dung D. Do, Burbank, both of Calif.

[73] Assignee: Dataproducts Corporation, Woodland Hills, Calif.

[21] Appl. No.: 477,132

[22] Filed: Feb. 21, 1983

[51] Int. Cl.³ .................................... H02K 29/04
[52] U.S. Cl. ................................ 318/696; 318/685
[58] Field of Search ............ 318/696, 685; 310/49 R

[56] References Cited

U.S. PATENT DOCUMENTS 3,374,410 3/1968 Crongmist et al. ............... 310/49 R
4,065,708 12/1977 Ulland et al. ....................... 318/685

OTHER PUBLICATIONS

Kuo et al., Proceedings 11th Annual Synposium on Incremental Motion Control Systems and Devices, May 1982, pp. 295-308.

Higuchi, ibid, pp. 289-294.

Primary Examiner—J. V. Truhe
Assistant Examiner—Saul M. Bergmann
Attorney, Agent, or Firm—Spensley Horn Jubas & Lubitz

[57] ABSTRACT

A closed loop control system for a stepper motor provides the necessary feedback to accurately control the position of a motor during acceleration, constant velocity and deceleration. Generation of commutation signals is based upon a monitoring of motor position to determine the points where commutation would result in maximum accelerating torque during acceleration and constant velocity and minimum braking torque during deceleration. These points indicate the earliest points at which commutation may occur. Commutation may be delayed in order to reduce the accelerating torque during acceleration and constant velocity or increase the braking torque during deceleration.

21 Claims, 16 Drawing Figures

PHASE COMMUTATOR FOR CLOSED LOOP CONTROL OF A STEPPING MOTOR

BACKGROUND OF THE INVENTION

1. Field of the Invention.

This invention relates to stepper motors which are controlled by means of electronic commutation, and more particularly, to the use of stepper motors in incremental motion in a closed loop mode. Still more particularly, this invention relates to the use of stepper motors to provide paper drive in high-speed printer systems.

In order to increase the throughput of a printer, either printer time, housekeeping time, or paper feed time must be reduced. In order to provide the required print quality, it is desirable to maintain print time at a predetermined level. Therefore, an increase in throughput without a resulting decrease in print quality is best obtained by reducing the paper feed time, i.e., the time to move from one print line to the next. The motion must be well controlled despite the fact that the load is subjected to a wide range of disturbing torques such as friction and paper weight.

2. Description of the Prior Art.

Although most stepper motors are used in an open loop mode, some designs have incorporated such motors into closed loop systems. One such system is disclosed in U.S. Pat. No. 4,136,308, issued to Kenyon King on Jan. 23, 1979. This patent discloses a method by which a dc power source is switched successively in four stator windings of a four-phase bifilar stepper motor. Switching time in relation to shaft position is controlled by sensing the back electromotive force (EMF) in the stator windings to provide signals indicating the position of the rotor of the motor. The back EMF sensing circuit is a transformer with a winding in series with two windings of the stator and another winding in series with the other two windings of the stator. A pulse is produced each time the voltage across the two transformer windings are equal. These pulses are used to generate clock signals for sequencing the switching (commutation) of the stator windings. The signals provided by the sensing circuit correspond to an angular position of the motor at which switching must occur to obtain maximum torque (either acceleration or braking) from the motor.

The above-described system has two main disadvantages associated with it. The first is the need for a special transformer to generate the position indicating signals. Second, the method of control of the motor is unreliable when used in incremental motion in the presence of disturbing torques such as friction. Over and above these drawbacks, the control system for this motor is such that the motor is initially operated in an open loop mode until sufficient speed is obtained to enable the transformer to generate a useable sensing signal. During this mode of operation the system is vulnerable to disturbing torques.

Other stepper motor control systems are disclosed in U.S. Pat. No. 4,126,821 to Cannon, U.S. Pat. No. 4,234,838 to Langely, et al., and U.S. Pat. No. 4,262,240 to Arai. None of these systems is well suited for providing incremental motion in a paper feed system.

SUMMARY OF THE INVENTION

The present invention provides a closed loop control system for a stepping motor which provides negative feedback to accurately control the motor during acceleration, constant velocity and deceleration. In a preferred embodiment, commutation signals to the motor are provided by a microprocessor. A sensing circuit is used to sense the current in the energized windings in order to detect the back EMF in the windings. The detected values are used to generate first and second position indicating signals which indicate that the motor is in a position where commutation would provide maximum accelerating torque and minimum braking torque, respectively. A logic circuit is used to couple a selected one of the position indicating signals to the microprocessor.

A table of delay times which corresponds to a desired velocity profile for the motor is stored in the microprocessor. After an initial commutation signal is applied to the motor, the microprocessor generates reference signals after a predetermined delay from the delay table. During acceleration and constant speed operation, the first position signal is coupled to the microprocessor, and a subsequent commutation signal is generated upon the occurrence of the later of the reference signal or position signal. If the motor is accelerating too slowly, the reference signal will occur prior to the position signal and commutation will coincide with the position signal, thus applying maximum accelerating torque to the motor. If the motor is accelerating too fast, the reference signal will occur after the position signal and commutation will occur at a point where reduced accelerating torque is applied to the motor.

During deceleration, the logic circuit is switched to couple the second position signal to the microprocessor to control the generation of commutation pulses. If the motor is decelerating faster than desired, the reference signal will occur prior to the position signal and commutation will occur at a point which will result in zero braking torque being applied to the motor. If deceleration is not fast enough, the reference signal will occur after the position signal and increased braking torque will be applied.

By providing the second position signals, the necessary feedback to compensate for disturbing torques can be applied to the motor. That is, if friction or some other disturbing torque causes the motor to decelerate, the system of the present invention takes this into account in determining the necessary amount of decelerating torque. Accurate control of the stepping motor is thus provided with a simple and low-cost system.

BRIEF DESCRIPTION OF THE DRAWINGS

The invention will now be described with reference to the attached drawings, wherein:

FIGS. 8a-9i show timing diagrams illustrating the generation of a control signal to the microprocessor.

DESCRIPTION OF THE PREFERRED EMBODIMENT

The following description is of the best presently contemplated mode of carrying out the invention. This description is made for the purpose of illustrating the general principles of the invention and should not be taken in a limiting sense. The scope of the invention is best determined by reference to the appended claims.

Figure 1:
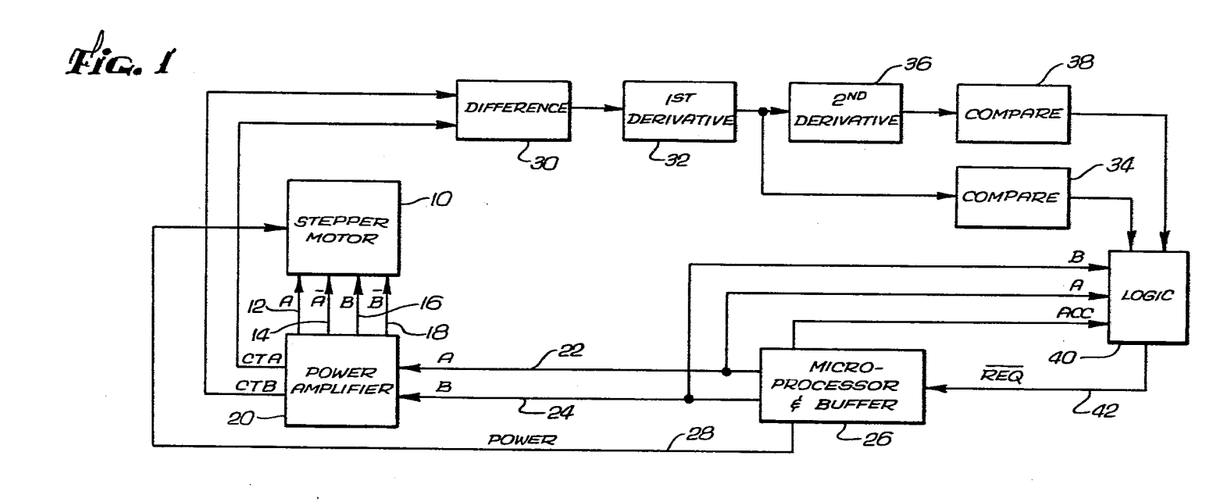
FIG. 1 is a block diagram of the motor control circuit of the present invention.

Referring to FIG. 1, the present invention is directed to control of the operation of a stepper motor 10 which may, for example, be used to drive the paper feed system of a high-speed line printer. In the present embodiment of the invention, the stepper motor 10 is a four-phase bifilar motor in which two phases are always energized. The motor typically operates at two hundred steps per revolution, i.e., 1.8° per step. These motors are characterized by high torque, small size and low cost.

Commutation signals to the different phases of stepper motor are provided along lines 12, 14, 16 and 18 by a power amplifier 20. The lines 12 (phase A) and 14 (phase $\overline{A}$) and 16 (phase B) and 18 (phase $\overline{B}$) are complements of each other, i.e., lines 12 and 14 are never energized simultaneously and lines 16 and 18 are never energized simultaneously.

The power amplifier 20 receives A and B commutation control signals along lines 22 and 24 to control the generation of commutation pulses to the stepper motor 10. When the line 22 is high, the line 12 will be energized, whereas when the line 22 is low, the line 14 will be energized. Similarly, the signal on line 24 controls the energization of the lines 16 and 18. The signals on lines 22 and 24 are provided by a microprocessor and buffer 26 which generates the commutation control signals at the appropriate time to provide the desired commutation. In addition, the microprocessor connects power to the stepper motor 10 by means of a power line 28.

The microprocessor 26 operates to provide commutation signals to the motor via the power amplifier 20 in order to achieve either acceleration, constant speed or deceleration. In order to provide such control, the motor must be commutated at predetermined points in relation to its shaft position. The point of commutation determines the amount of torque which is applied to the motor. The present invention operates to detect two distinct motor positions (i.e., the position of the rotor with respect to the stator windings). A first motor position which is detected corresponds to the point where commutation would result in the application of maximum accelerating torque to the motor. A second position which is detected corresponds to a point where commutation of the motor would result in the application of zero net torque to the motor, i.e., zero braking torque.

The detection of the first and second motor positions is accomplished by monitoring the back EMF of the motor. This is done by detecting the currents CT.A and CT.B flowing in the energized phases. These currents contain back EMF information which is extracted in a manner described below. A differential amplifier 30 determines the difference between the currents CT.A and CT.B. A differentiator 32 provides the first derivative of the difference signal from the amplifier 30, and a comparator 34 determines when the output of the differentiator is zero. This corresponds to a motor position at which commutation would result in the application of maximum accelerating torque to the motor shaft.

The output of the differentiator 32 is also applied to a second differentiator 36, which provides the second derivative of the difference in currents in the energized phases of the motor. When this difference is zero, a comparator 38 provides an output signal. The output signal of the comparator 38 corresponds to a motor position at which commutation would result in the application of zero net torque to the motor.

The signals from the comparators 34 and 38 are applied to a logic circuit 40. The logic circuit also receives the commutation signals A and B from the microprocessor 26, as well as a signal ACC which indicates whether the motor is operating in an acceleration or deceleration mode. The logic circuit generates a signal REQ on a request line 42 which is coupled to the microprocessor 26. The microprocessor generates the commutation signals A and B as a function of the signal REQ.

Figure 2:
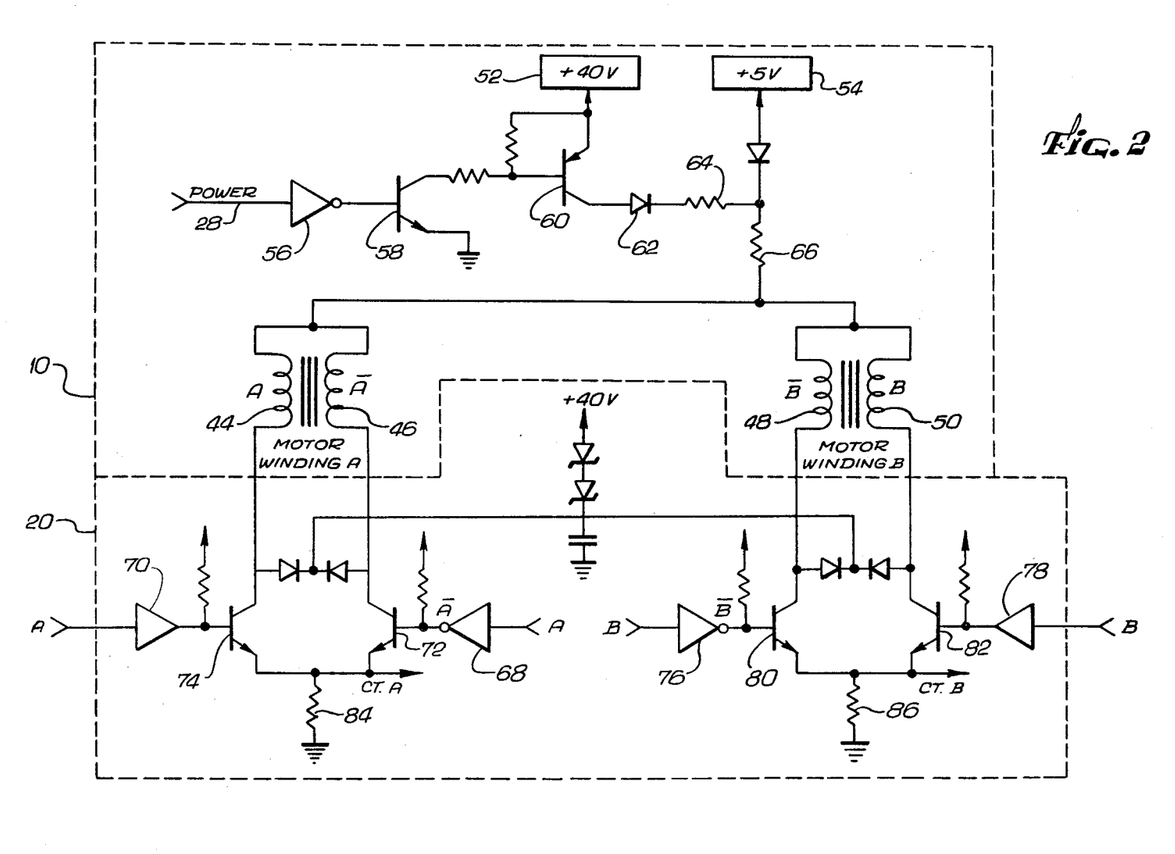
FIG. 2 is a schematic diagram of the motor and power amplifier used to drive the motor.

Referring now to FIG. 2, the motor 10 includes windings 44, 46, 48 and 50. The windings 44 and 46 are part of a bifilar winding, and only one of them is energized at a time. Similarly, only one of the windings 48 and 50 is energized at any particular time. During motor stepping, power is supplied to the windings from a power supply 52, and when the motor is stopped, it is held in position by supplying power to the windings from a power supply 54 having a lower voltage than the supply 52. When motor motion is desired, a signal on the power line 28 switches an inverter 56 which drives a transistor 58. The transistor 58 in turn switches a transistor 60, which couples power from the supply 52 to the motor windings through a diode 62 and resistors 64 and 66. When the motor stops, the state of the power line switches and the transistor 60 is turned off. The motor is then held in position by means of the power supply 54.

The commutation signals A and B from the microprocessor are coupled to the amplifier 20 so that each signal is connected to an inverting and noninverting input. The signal A is applied to an inverting amplifier 68 and noninverting amplifier 70. The signals from the amplifiers 68 and 70 are used to drive power transistors 72 and 74, respectively. Only one of the transistors 72 or 74 will be driven at a time. When the transistor 72 is on, current is passed through the winding 46 to energize that phase of the motor. Similarly, when the transistor 74 is turned on, the winding 44 is energized. Amplifiers 76 and 78 and transistors 80 and 82 control the operation of the windings 48 and 50 in an identical fashion.

In order to detect the currents which are flowing in the energized phases of the motor, current sensing resistors 84 and 86 are connected to the transistors 72, 74 and 80, 82, respectively. The voltage CT.A across the resistor 84 is proportional to the current flowing through the energized one of the transistors 72 and 74, and the voltage CT.B across the resistor 86 is proportional to the current flowing through the energized one of the transistors 80 and 82. The values of these voltages are a function of the back EMF of the energized windings.

Figure 3:
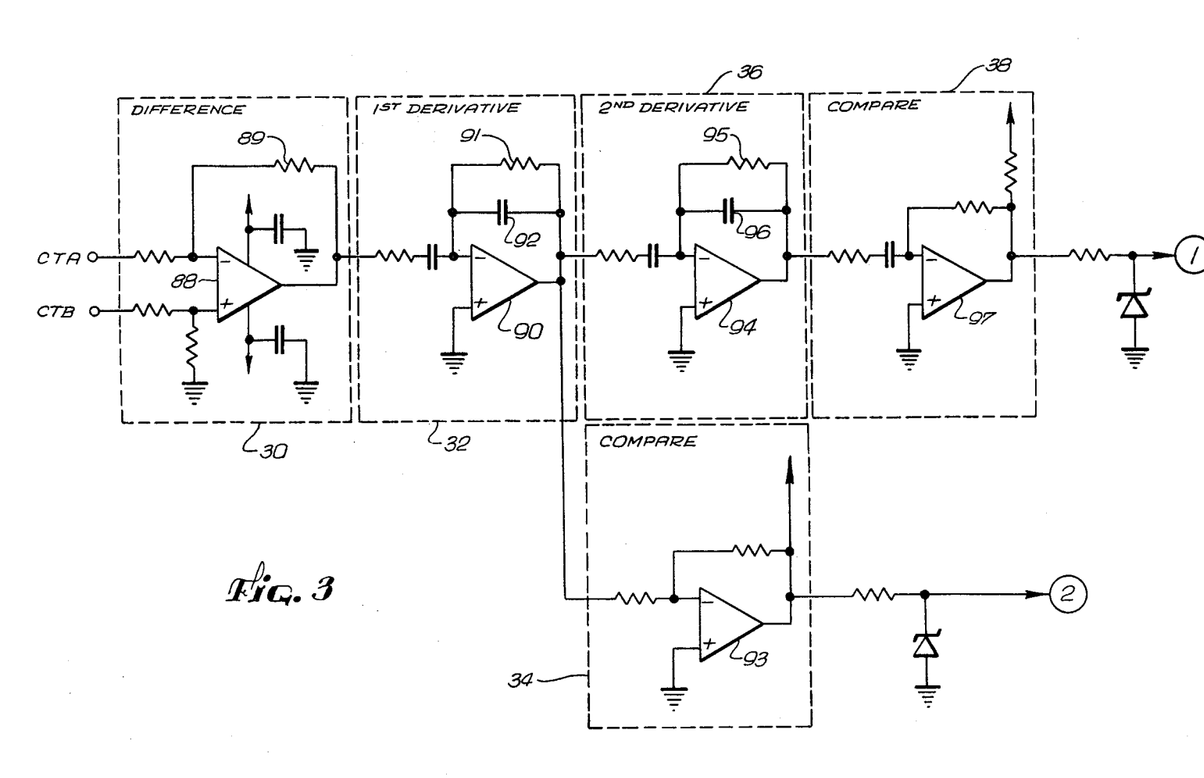
FIG. 3 is a schematic diagram of the position determination circuitry of the invention.

Referring to FIG. 3, the differential amplifier 30 and first and second differentiators 32 and 36 are used to extract the back EMF of the motor 10 in order to generate the required position signals. The difference circuit 30 includes an operational amplifier 88 and feedback resistor 89 which receives the signals CT.A and CT.B and provides an output proportional to the difference between the two signals. This output is connected to the first differentiator 32 which includes an operational amplifier 90, feedback resistor 91 and capacitor 92. The output of the amplifier 90 is compared to ground by means of the comparator 34 which includes an operational amplifier 92. When the difference between the signals CT.A and CT.B is minimum, the first derivative will be equal to zero, thus causing the output of the comparator to change states. This signal is then applied to the logic circuit 40. The first derivative signal from the amplifier 90 is again differentiated by the circuit 36 which includes an operational amplifier 94, feedback resistor 95 and capacitor 96. This output is then compared to ground by means of the comparator circuit 38, which includes an operational amplifier 97. The output of the amplifier 97 is also applied to the logic circuit 40.

Figure 4:
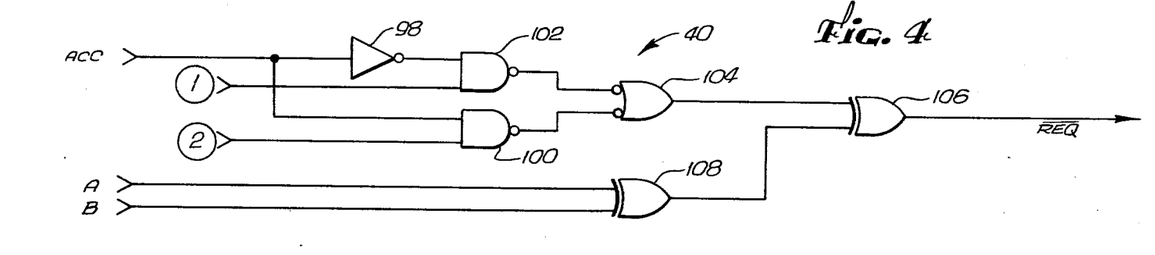
FIG. 4 is a schematic diagram of a logic circuit which is coupled to the position determination circuitry.

The logic circuit 40 is shown in detail in FIG. 4. It receives the signals from the comparators 34 and 38, as well as the commutation signals A and B from the microprocessor and the signal ACC from the microprocessor. The signal ACC is applied to an inverter 98 and NAND gate 100. The output of the inverter 98 is applied to a second NAND gate 102. The output of the comparator 34 is coupled to the NAND gate 100 and the output of the comparator 38 is coupled to the NAND gate 102. One of the signals from the comparators 34 and 38 will be passed via one of the NAND gates 100 102 to an OR gate 104, depending upon the state of the signal ACC. The output of the OR gate is coupled to an exclusive OR gate 106. The other input to the gate 106 is provided by a second exclusive OR gate 108, which receives the commutation signals A and B. The output of the exclusive OR gate 106 is the request line 42 which is used to control the microprocessor. The specific method by which the request line is generated will be discussed subsequently.

Figure 5:
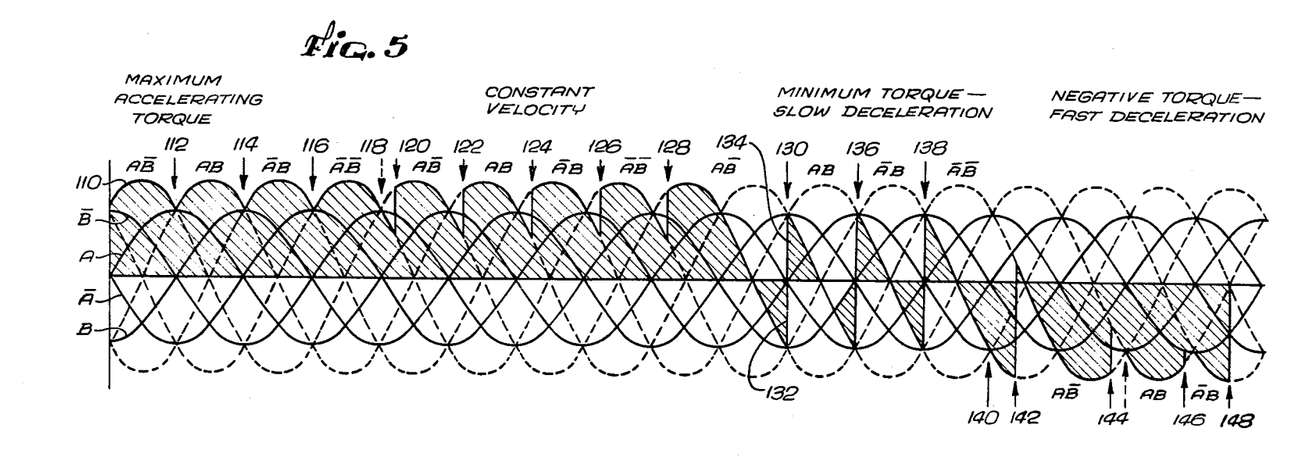
FIG. 5 is a graph showing the torque curves for each of the phases of the motor, as well as showing commutation points for achieving desired motor operation.

The torque curve for each of the phases of the motor is illustrated in FIG. 5. Each of these curves is a sine wave which is offset from an adjacent curve by 90°. The curves represent the torque which would be applied to the motor upon the energization of each phase. As previously stated, the motor is operated with two phases always switched on. The net torque applied to the motor is equal to the sum of the torques of the two energized phases. For example, in FIG. 5 phases A and $\overline{\text{B}}$ are initially energized. The sum of the torques of these two phases is shown by a curve 110 and the area under the curve is shown shaded.

In order to achieve maximum accelerating torque, commutation should occur so that neither of the energized phases is in its negative torque region. Thus, when the motor reaches a position where the torque in the $\overline{\text{B}}$ phase is zero, i.e., at point 112, the phases are switched and the B phase is energized. The energization continues to a point 114, where the A phase is switched off and the $\overline{\text{A}}$ phase is energized. The $\overline{\text{B}}$ phase is again energized at point 116. By commutating at the points 112, 114 and 116, the maximum available accelerating torque will always be applied to the motor.

If maximum accelerating torque is not desired, e.g., when the motor is running at a constant velocity (some accelerating torque is necessary to overcome the effects of friction) or is accelerating at a faster rate than desired, the commutation points must be shifted so as to reduce the net torque. Thus, instead of commutating at the point 118 where maximum torque would result, commutation may be delayed to a point 120. Thus, the $\overline{\text{A}}$ phase will remain energized during a time period (between the points 118 and 120) when its torque is negative. The overall torque will remain positive, since the positive torque of the phase $\overline{\text{B}}$ is greater than the negative torque of the $\overline{\text{A}}$ phase. The net torque, which is the area under the torque curve (indicated as shaded areas) is thus reduced. In order to achieve constant velocity in the presence of frictional torque, the phases should be energized at the same points on the torque curves, i.e., the commutation points 122-128 should be delayed with respect to the commutation point for maximum accelerating point by the same amount of the delay between the point 118 and the point 120.

Thus, during acceleration or constant velocity operation commutation is controlled so as to provide either maximum accelerating torque or reduced accelerating torque. During the deceleration portion of a movement, however, commutation should occur at a point which provides either zero net torque, with deceleration occuring because of frictional effects, or at a point which provides a decelerating torque. This is accomplished by delaying an extra 90° with respect to the commutation point for achieving maximum accelerating torque. By commutating at point 130, the torque will initially go negative (area 132) and subsequently go positive (area 134) to thereby result in zero net torque. Under these circumstances, the motor will slowly decelerate due to the effects of friction. Commutation at points 136 and 138 will continue to result in zero net torque.

In order to apply decelerating torque to the motor, commutation should take place so as to provide net negative torque to the motor. To accomplish this, commutation is delayed even further so that is occurs beyond the zero torque point. Thus, whereas commutation at point 140 would result in zero net torque, commutation at point 142 results in an increased amount of negative torque. The amount of torque can be increased by further increasing the delay in commutation with respect to the zero torque point. This is illustrated by points 144 and 146. The motor will stop by halting commutation, which will cause the motor to be held at a point 148 (phases $\overline{\text{A}}$ and B energized).

As discussed above, the circuitry which provides the first and second derivatives generates position signals indicating when the motor is in a position where commutation would result in maximum accelerating torque (e.g., points 112, 114 and 116 in FIG. 5) or zero torque (e.g., points 130, 136 and 138). By commutating at these points, either maximum accelerating torque or zero (minimum braking) torque will result. By delaying commutation after these points, accelerating torque may be decreased (points 120-128) and braking torque increased (points 142-146). The microprocessor utilizes these position signals to control the generation of the commutation signals to provide the desired operation of the motor.

Figure 6:
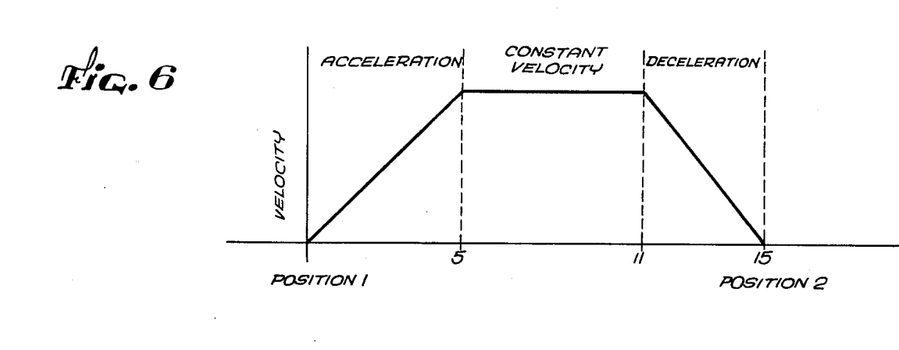
FIG. 6 is a graph showing a desired velocity profile for the motor.

FIG. 6 shows a velocity profile for an incremental move of the motor. The velocity profile represents the desired motion of the motor from a first position to a second position. In the profile shown, the incremental move comprises 15 motor steps. During an acceleration phase, it is desirable to accelerate the motor as fast as is possible, i.e., to commutate to achieve maximum accelerating torque. During a constant velocity phase, commutation should occur so as to achieve a reduced, constant amount of torque necessary to maintain the desired velocity. During deceleration, commutation should occur to provide either zero torque or braking torque.

The microprocessor operates to generate commutation signals which will achieve the velocity profile of FIG. 6. This is accomplished by programming a table of delays which indicate the earliest time after a commutation at which the next commutation may take place. These delays are utilized in connection with the request line to control the generation of the commutation signals A and B.

The request line 42 goes low after the optimum point for commutation has been traversed and goes high after commutation takes place. During acceleration and constant velocity, the optimum commutation point (the point for achieving maximum accelerating torque) is indicated by the output of the comparator 34, and the signal ACC is used to enable the NAND gate 100 to couple the comparator output to the exclusive OR gate 106. Thus, during acceleration, the request line will go low when the comparator 34 indicates that the optimum point for commutation has been reached. After commutation takes place, i.e., when the state of one of the signals A or B changes, the signal from the exclusive OR gate 108 will cause the request line 42 to go high.

After each commutation, a predetermined delay is initiated by the microprocessor. After the end of the delay, the request line 42 is monitored and a commutation pulse generated when the request line goes low. The initial delays are set to be quite short so that the delay will end prior to the motor reaching the optimum commutation point. Commutation will therefore occur at the optimum commutation point and maximum accelerating torque will be provided. If the system is accelerating too fast, the motor will be moving at a velocity higher than desired and the delay will end after the optimum commutation point. Commutation will therefore occur at a point where less torque than the maximum available from the motor will be applied. Thus, negative feedback will be applied to either provide maximum accelerating torque or a reduced amount of accelerating torque.

Once the constant velocity phase of the motor movement is reached (i.e., motor step 5 in FIG. 6) less than the maximum torque must be applied to the motor. During this phase, the microprocessor control program provides a fixed delay after each commutation pulse. This delay is set so that it will end at some point after the optimum (maximum accelerating torque) commutation point if the velocity is at the desired value. If the velocity is somewhat above the desired value, the delay will end at a point further down the torque curve and the applied accelerating torque will be reduced. If the velocity is lower than that desired, the delay will end closer to (or even before) the optimum commutation point and increased accelerating torque will be applied. Thus, the required negative feedback is provided during the constant velocity phase.

At the beginning of deceleration, (step 11 is FIG. 6) the signal ACC is switched so that the second derivative signal from the comparator 38 controls the generation of the signal on the request line 42. Thus, instead of monitoring the point where commutation would result in maximum accelerating torque, the system monitors the point where commutation would result in zero net torque, i.e., minimum braking torque. During the initial part of the decleration phase, the delays are set relatively low so that they will end prior to the motor reaching the zero torque point. Commutation will thus occur at the zero torque point and the motor will be coasting. Some deceleration will occur, however, due to the effects of friction. The velocity profile is chosen so that the braking due to friction will initally cause the motor velocity to be less than the command velocity (i.e., the motor will decelerate faster than required). During later steps, the delay time is set longer (corresponding to a stepper deceleration curve) and will end after the motor has passed the zero torque point. At the end of the delay, commutation will occur and braking torque in addition to that caused by friction will therefore be applied to the motor.

The table of delays during deceleration correspond to a desired rate of deceleration. If the motor is decelerating too slowly, its velocity will be above that desired and the request line will change states sooner than anticipated. The delay will therefore end at a point on the torque curve which is further away from the zero torque point and increased braking torque will be applied to the motor. If the motor is decelerating too quickly, the delay will end prior to the zero torque point and no additional braking torque above that contributed by friction will be applied. Thus, the system also provides the required negative feedback during deceleration to accurately control the commutation of the motor.

The delay table which gives the duration of the delay for each step of the motor along the velocity profile is critical to the reliability of the system. On acceleration it is desirable to use the maximum torque available from the motor to insure a minimum increment time. The delay table is thus designed along an acceleration profile that is less than what the motor can do under the worst conditions. As a result, the delays will always end before the optimum commutation point and maximum accelerating torque will be provided. Theoretically, the delay could be equal to zero along this phase, but practically it should be long enough to mask the commutation transient duration at the highest speed of operation to avoid detection of false commutation points. During the constant speed phase the delay is made constant corresponding to the desired speed. The first derivative is used to provide accelerating torque to the motor until the point where the delay ends is after the optimum point. At this point, the torque is reduced and the system slows down.

During deceleration, the second derivative is used to detect the zero torque commutation point. The table of delays is set up to follow a deceleration profile that requires less braking torque than the motor is capable of developing in the system. Initially, friction will cause deceleration at a rate lower than that commanded in the delay table. This condition is maintained until the point where the delays start occurring beyond the zero torque commutation point, at which point negative torque will be applied to the system. Thus, during any phase of operation, the presence of disturbing torques such as friction will not prevent the motor from being accurately controlled.

Figure 7:
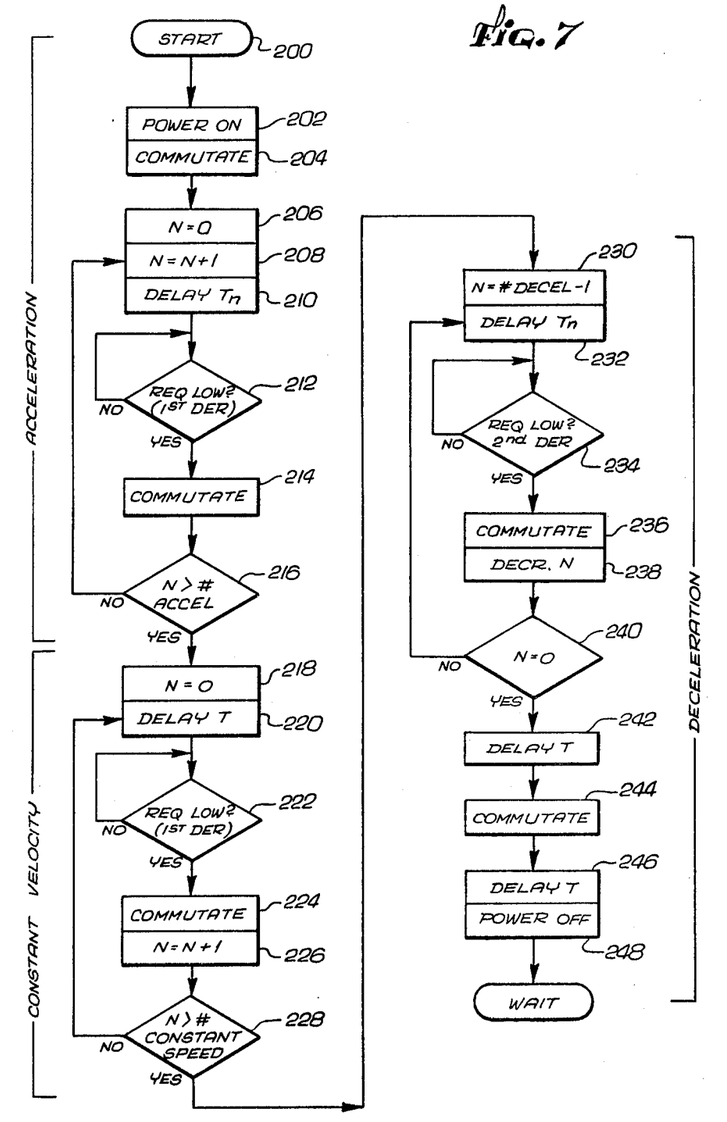
FIG. 7 is a flow chart of a microprocessor control program for generating commutation signals to the motor.

FIG. 7 shows the control program for the microprocessor. When incremental motion is desired, the program is started, step 200. This causes the power line 28 to go on, step 202, to connect the power supply 52 to the motor windings (FIG. 2). The motor is then initially commutated, step 204, to begin moving the motor from its rest position. The step value N of the incremental motion is initially equal to zero, step 206, and after the first commutation is incremented to one, step 208. After this initial commutation, the microprocessor delays for a time period $T_n$, step 210. This delay corresponds to the amount of delay which has been determined is necessary to achieve the desired velocity profile. At the end of this delay an internal reference signal is generated and the request line is monitored, step 212. When the request line goes low (or if it is already low), the motor is again commutated, step 214. The number N is then compared to the number of steps during the acceleration phase, step 216, and if it is lower than the number of steps in acceleration, the program returns to step 208, increments N and begins a new delay. After this delay, the request line is again monitored and commutation occurs when the request line is low. It is noted that the state of the request line during this acceleration phase is controlled by the position signal obtained from the first derivative.

The steps 208–216 are repeated until all of the acceleration steps have been completed. At this point, the program continues to the constant velocity phase, which starts with N being set to zero, step 218. After a fixed delay, step 220, the request line is monitored, step 222. During this phase, the request line is also controlled by the signal obtained from the first derivative of the current difference in the energized phases. When the request line is low, the motor is commutated, step 224. N is then incremented by one, step 226, and compared to the number of steps at which constant speed is desired, step 228. If the steps are less than that desired, the program returns to step 220 and repeats the sequence. Once the desired number of steps at constant velocity have been made, the microprocessor program moves into the deceleration phase and N is set to the number of deceleration steps required minus one, step 230. After a delay of $T_n$, step 232, the request line is monitored, step 234. As previously described, during deceleration, the value of the request line is based upon the second derivative of the current difference in the energized phases. When the request line is low, the motor is commutated, step 236. The value of N is then decremented by one, step 238, and compared to zero, step 240. If N is greater than zero, the program returns to step 232 and a new delay is started. As is the case during acceleration, the delay during deceleration may be different for each step. When N equals zero, another delay is initiated, step 242, and the last commutation occurs, step 244. After another delay, step 246, the power signal goes off, step 248, and the motor is held in position by the power supply 54 (FIG. 2).

Thus, in the acceleration, constant speed and deceleration phases, the request line is monitored after a predetermined delay (indicated by the generation of an internal reference signal at the end of the delay) and commutation occurs when the request line goes low. If the request line goes low before the end of the delay, commutation will occur immediately when the delay ends. During acceleration and constant velocity, the generation of the request line is based upon the first derivative of the current difference in the energized phases, i.e., the request line goes low when the motor is at a point where commutation would provide maximum accelerating torque. During the deceleration phase, the state of the request line is determined by the second derivative of the current difference in the energized phases, i.e., the request line will go low when the motor is at a point where commutation would result in zero net torque.

Figure 8A:
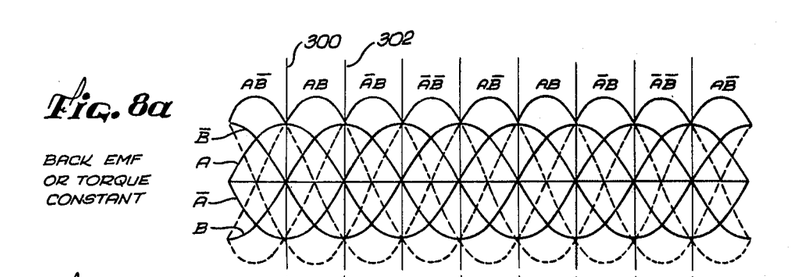
Figure 8B:
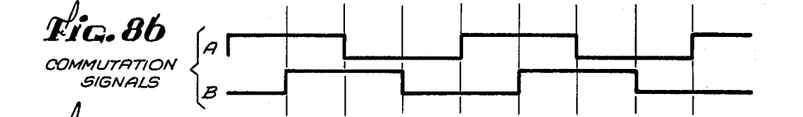
Figure 8C:
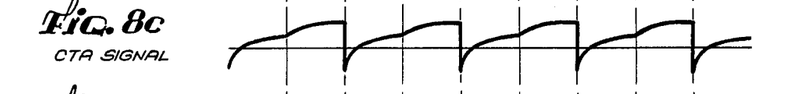
Figure 8D:
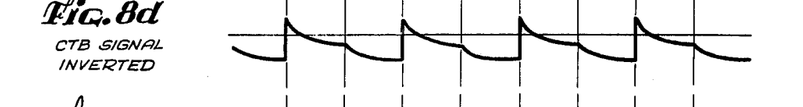
Figure 8E:
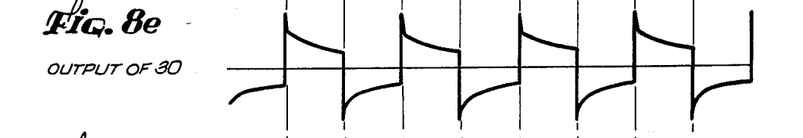
Figure 8F:
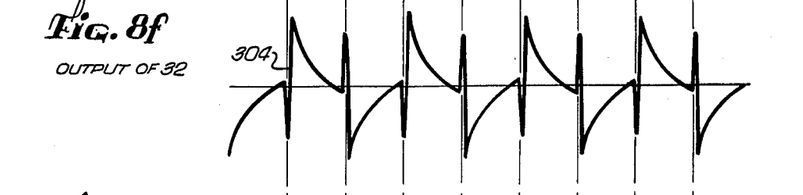
Figure 8G:
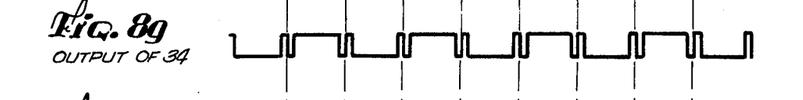
Figure 8H:
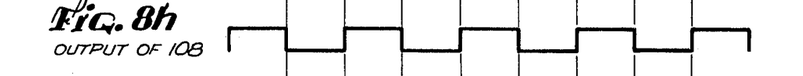
Figure 8I:
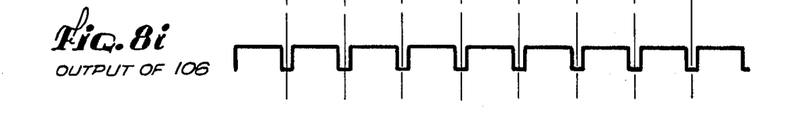

The generation of the request line is illustrated in FIGS. 8(a)–(i). FIG. 8(a) illustrates the back EMF or torque constant of the four phases of the motor, as well as the net torque obtained when the phases are energized for maximum torque. FIG. 8(b) shows the commutation signals A and B for achieving maximum accelerating torque. The signal CT.A is shown in FIG. 8(c). When a phase is switched on, the current through it will rise exponentionally. However, the value of this signal will vary depending upon the value of the back EMF in that phase. The inverted value of the signal CT.B is shown in FIG. 8(d). This signal is identical to the signal CT.A except that it is 90° out of phase and is affected by the back EMF in the B phase of the motor rather than the A phase. Thus, at point 300, the signal CT.A will be affected by the back EMF of the A phase, which is a descending sine wave, and the signal CT.B will be affected by the back EMF of the B phase, which is an ascending sine wave. Therefore, during the time period when the A and B phases are energized, (i.e., after point 300), the affect of the back EMF in phase A on CT.A is decreasing and the affect of the back EMF in phase B on CT.B is increasing. The difference between the contributions of back EMF to the signals CT.A and CT.B is at a minimum at point 302. By subtracting the signal CT.B from the signal CT.A, this minimum point can be detected. This is shown in FIG. 8(e), which illustrates the output of the difference circuit 30. The first derivative of this signal will cross zero at the point of minimum difference between the back EMF and phases A and B, i.e., at the optimum point of commutation to achieve maximum accelerating torque. This signal is indicated in FIG. 8(f). This signal includes and inductive kick 304 which occurs after commutation. The value of the first derivative is compared zero by the comparator 34, and this output is illustrated in FIG. 8(g). This signal is applied to the logic circuit 40. The commutation signals A and B are subjected to an exclusive OR function by the gate 108 to produce the signals shown in FIG. 8(h). This signal is applied to the exclusive OR gate 106 along with the signal from the comparator 34 to establish the request line shown in FIG. 8(i). This request line goes low at the point of optimum commutation (e.g., points 300 and 302) and high after commutation occurs.

The position signal indicating the points at which commutation would result in zero torque is generated in a similar fashion, except that the second derivative signal (the output of the circuit 36) is used to establish the request line. This signal will go low at a point 90° out of phase with respect to the request line generated based upon the first derivative. In either case, the request line will be generated independent of the point of commutation, i.e., commutation does not have to occur at the optimum points in order for the request line to be accurately generated.

In summary, the present invention provides a closed loop stepper motor control circuit which provides negative feedback during acceleration, constant speed and deceleration to accurately control the motion of a motor. The back EMF of the motor is sensed to provide a determination of the optimum points of commutation to achieve either maximum accelerating torque or minimum braking torque. During acceleration and constant velocity, the signal indicating commutation points for maximum accelerating torque are used to control the generation of commutation signals to the motor. A microprocessor provides a predetermined delay after each commutation. At the end of the delay, the microprocessor monitors the request line and generates a commutation signal when the request line goes low. During deceleration, commutation is controlled in response to the position signals indicating when the motor is at point where commutation would result in minimum braking torque. This torque may be either maintained at zero or increased to speed up the deceleration of the motor.

Although the invention has been described in terms of monitoring the back EMF to obtain the position signals, the invention is not so limited. Any type of detector which would provide signals indicating the desired commutation points would be suitable. The back EMF detection has the advantage that no additional transducers of any kind are needed. Even if the back EMF is utilized, the determination of the optimum commutation points need not be accomplished in the manner described. For example, although the request line determination has been accomplished by means of discrete logic, it could be done by means of software. Alternatively, a transformer circuit such as that disclosed in the above-mentioned U.S. Pat. No. 4,136,308 could be utilized, at least to the extent of providing signals indicating optimum commutation points for maximum accelerating torque. Regardless of how the optimum points for commutation are determined, the generation of the commutation signals to the motor will be based upon the theory of providing a velocity profile defined by the length of delays after each commutation and monitoring the request line at the end of the delay.

We claim:

1. A commutation circuit for a stepping motor comprising:
    first sensor means for providing first position signals indicating that the motor is in a position where commutation would result in maximum accelerating torque;
    second sensor means for providing second position signals indicating that the motor is in a position where commutation would result in minimum braking torque; and
    control means for generating commutation signals to the motor during acceleration in response to the first position signals and during deceleration in response to the second position signals.

2. The circuit of claim 1 wherein the control means:
    generates a commutation signal immediately upon receipt of a first position signal when maximum acceleration is desired and after a delay after receipt of a first commutation signal when lesser acceleration or constant velocity is desired; and
    generates a commutation signal immediately upon receipt of a second position signal when minimum braking is desired and after a delay after receipt of a second commutation signal when increased braking is desired.

3. The circuit of claim 2 wherein the control means includes means for generating a reference signal after a predetermined delay after each commutation signal, wherein a subsequent commutation signal is generated upon the occurrence of the later of the next position signal and reference signal.

4. The circuit of claim 2 wherein the control means includes means for monitoring the state of the position signals after a predetermined delay after each commutation signal, wherein a subsequent commutation signal is generated when the monitored position signal is a particular state.

5. The circuit of claim 3 wherein the control means includes a microprocessor which receives position signals from the first and second sensor means, generates the reference signals and generates commutation signals in response to the position signals and reference signals.

6. The circuit of claim 5 wherein the control means includes a logic circuit for receiving the first and second position signals and selectively coupling one of the signals to the microprocessor depending upon whether acceleration or deceleration is desired.

7. The circuit of claim 5 wherein the microprocessor includes a memory for storing a table of delay values representing the amount of the delay after each commutation pulse in a motor movement from one position to another.

8. The circuit of claim 1 wherein the first and second sensor means includes means for detecting the back electromotive force generated by the motor.

9. The circuit of claim 8 wherein the motor includes a plurality of phases which are selectively energized and wherein the first and second sensor means includes means for detecting the current flow in the energized windings.

10. The circuit of claim 9 wherein the motor includes four phases, two of which are energized at a time, and wherein the first sensor means comprises means for determining the first derivative of the difference in currents in the energized phases and the second sensor means comprises means for determining the second derivative of the difference in currents in the energized phases.

11. The circuit of claim 10 wherein the first sensor means includes a comparator for determining when the first derivative is zero and the second sensor means includes a comparator for determining when the second derivative is zero, wherein the comparator output provide the position signals.

12. A closed loop commutation circuit for a stepping motor comprising:
    control means for generating commutation signals to the motor and internal reference signals, wherein a reference signal is generated after a predetermined delay following each commutation signal;
    feedback means for generating position signals indicating the position of the motor, wherein during acceleration or constant speed operation the position signals are generated when the motor is in a position where commutation would result in maximum accelerating torque and during deceleration the position signals are generated when the motor is in a position where commutation would result in minimum braking torque;
    wherein the control means generates a commutation signal upon the occurrence of the later of a reference signal and position signal, whereby appropriate feedback will be applied to the circuit during both acceleration and deceleration.

13. A circuit for controlling the commutation of a stepping motor during deceleration, comprising:
    sensing means for detecting the position of the motor and providing indicator signals at points where commutation would result in minimum braking torque;
    control means for (a) generating a reference signal a predetermined amount of time after each commutation, wherein the amount of delay between commutation and a corresponding reference signal represents a desired rate of deceleration, and (b) generating a subsequent commutation signal after the occurrence of both the first indicator signal after a commutation and a corresponding reference signal.

14. A closed loop circuit for causing a stepping motor to be commutated to achieve a desired rate of deceleration, comprising:
  sensing means for providing position signals indicating that the motor is in a position where commutation would result in minimum braking torque; and
  control means for receiving the position signals and generating commutation signals to the motor, said control means including timing means for causing a commutation pulse to be generated upon the occurrence of a position signal if the motor is decelerating faster than desired and some time after the occurrence of a position signal if the motor is decelerating slower than desired, wherein the delay between the occurrence of a position signal and the generation of a commutation signal results in the application of increased braking torque to the motor.

15. The circuit of claim 14 wherein the sensing means provides position signals as a function of the back electromotive force of the motor.

16. The circuit of claim 15 wherein the motor is a four phase stepping motor in which two phases at a time are energized, wherein the sensing means includes means for detecting the current in the energized phases, means for taking the second derivative of the difference in current in the energized phases, and means for generating the position signals when the second derivative is at a minimum.

17. The circuit of claim 14 wherein the control means comprises a microprocessor which generates a commutation signal, generates a reference signal a predetermined amount of time after the commutation signal, receives the position signal and generates a subsequent commutation signal upon the occurrence of the later of the reference signal and position signal, wherein if the motor is decelerating more slowly than desired the reference signal will occur after the position signal and increased braking torque will be applied to the motor and if the motor is decelerating more quickly than desired the reference signal will occur prior to the position signal and minimum braking torque will be applied to the motor.

18. A circuit for controlling the commutation of a stepping motor during deceleration, comprising:
  sensing means for providing an indicator signal corresponding to motor positions where commutation would result in minimum braking torque; and
  control means for:
    (a) providing a reference signal a predetermined amount of time after each commutation, wherein the delay between commutation and a subsequent reference signals is a function of the desired rate of deceleration of the motor, and
    (b) generating a commutation pulse upon the occurrence of the later of the indicator signal and reference signal, whereby if the motor is decelerating at or above the desired rate the reference signal will be generated at or before the occurrence of the indicator signal and commutation will coincide with the indicator signal and minimum braking torque will be applied to the motor, and if the motor is decelerating below the desired rate the reference signal will be generated after the occurrence of the indicator signal and increased braking torque will be applied to the motor.

19. A commutation circuit for a stepping motor which is subjected to disturbing torques such as friction, comprising:
  sensor means for providing position signals indicating the position of the rotor of the motor; and
  control means for receiving the position signals and generating commutation signals in response thereto to energize difference phases of the motor and cause the motor to accelerate, move at constant velocity or decelerate at a desired rate, said control means including feedback means for (a) increasing accelerating torque of the motor to compensate for disturbing torques occurring during acceleration and constant velocity and (b) increasing braking torque of the motor from its minimum value to add to the braking provided by disturbing torques during deceleration.

20. The circuit of claim 19 wherein:
  the sensor means provides first position signals when the motor is in positions where commutation would result in maximum accelerating torque and second position signals when the motor is in positions where commutation would result in minimum braking torque; and
  the control means includes delay means for generating a reference signal a predetermined amount of time after each commutation signal, wherein during acceleration and constant velocity a commutation signal is generated upon the occurrence of the later of the reference signal and first position signal and during deceleration a commutation signal is generated upon the occurrence of the later of the reference signal and second position signal.

21. The circuit of claim 19 wherein:
  the sensor means provides first position signals indicating when the motor is in positions where commutation would result in maximum accelerating torque and second position signals indicating when the motor is in positions where commutation would result in minimum braking torque; and
  the control means includes means for monitoring the state of one of the first and second position signals after a predetermined delay after each commutation signal, wherein during acceleration and constant velocity a commutation signal is generated upon the first position signal being in a particular state after the predetermined delay and during deceleration a commutation signal is generated upon the second position signal being in a particular state after the predetermined delay.

* * * * *